(12) United States Patent
Caplan

(10) Patent No.: US 7,182,533 B1
(45) Date of Patent: *Feb. 27, 2007

(54) KEYBOARD CONTOURED TO THE NATURAL SHAPE OF THE HAND

(75) Inventor: Leslie S. Caplan, San Francisco, CA (US)

(73) Assignee: Prosper Street Technologies, LLC, Mill Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/563,999

(22) Filed: May 3, 2000

Related U.S. Application Data

(63) Continuation-in-part of application No. 09/229,649, filed on Jan. 13, 1999, now Pat. No. 6,183,149, which is a continuation-in-part of application No. 08/957,964, filed on Oct. 21, 1997, now Pat. No. 5,899,616.

(51) Int. Cl.
*B41J 5/10* (2006.01)
*B41J 5/12* (2006.01)
(52) U.S. Cl. .................. 400/489; 400/488; 400/490
(58) Field of Classification Search ............... 400/472, 400/488, 489, 490, 492, 491, 491.3, 714, 400/715; 235/145 R; 345/168, 169; 341/22, 341/21
See application file for complete search history.

(56) References Cited

U.S. PATENT DOCUMENTS

| 726,107 A | 4/1903 | Stanton |
|---|---|---|
| 832,617 A | 10/1906 | Munson et al. |
| 1,203,570 A | 11/1916 | Beaubien |
| 1,468,566 A * | 9/1923 | Hall ................. 235/145 R |
| 2,102,526 A | 12/1937 | Guilfoyle |
| 2,181,955 A | 12/1939 | Ward, Jr. |
| 2,369,807 A * | 2/1945 | Solon .................. 400/489 |
| 2,733,804 A | 2/1956 | Wesson |
| 3,848,723 A | 11/1974 | Hogue |
| 3,929,216 A | 12/1975 | Einbinder |
| 4,042,090 A | 8/1977 | Hasebe et al. |
| D270,071 S * | 8/1983 | Reese .................... D18/12 |
| 4,501,936 A | 2/1985 | Morse |
| 4,565,460 A * | 1/1986 | Kline .................... 400/490 |
| 4,597,681 A * | 7/1986 | Hodges ................. 200/331 |
| 4,734,679 A | 3/1988 | Haskins |
| 4,755,072 A | 7/1988 | Hoornweg |

(Continued)

OTHER PUBLICATIONS

Just Rubber Industry Co., Ltd. Brochure (from the Internet).

(Continued)

*Primary Examiner*—Leslie J. Evanisko
(74) *Attorney, Agent, or Firm*—Quine Intellectual Property Law Group, P.C.

(57) ABSTRACT

This invention provides novel keyboards comprising keys disposed such that they minimize the distance a finger typically must travel to effect a keystroke and the force that is applied to effect a keystroke. Accordingly the keyboards require less arm and finger movement to and thereby reduce the likelihood of an operator developing a repetitive stress injury (RSI). In one embodiment the keyboards comprise a plurality of keys disposed such that the alphanumeric keys form a continuous key array defining a key array surface having at least two concave regions wherein a plurality of keys present irregular and/or non-rectilinear striking faces.

47 Claims, 14 Drawing Sheets

U.S. PATENT DOCUMENTS

| | | | |
|---|---|---|---|
| 4,940,346 A * | 7/1990 | Liljenquist | 400/472 |
| 4,974,183 A | 11/1990 | Miller | |
| 5,021,638 A | 6/1991 | Nopper et al. | |
| 5,080,155 A | 1/1992 | Crozier | |
| 5,145,270 A | 9/1992 | Darden | |
| 5,183,346 A | 2/1993 | Tesar | |
| 5,244,296 A | 9/1993 | Jensen | |
| 5,270,507 A | 12/1993 | Nakamura et al. | |
| 5,290,115 A | 3/1994 | Little | |
| D348,877 S * | 7/1994 | Lichtenberg | D14/456 |
| 5,391,006 A | 2/1995 | Danziger | |
| 5,464,292 A | 11/1995 | Grant | |
| 5,490,647 A | 2/1996 | Rice | |
| 5,491,313 A | 2/1996 | Bartley et al. | |
| 5,507,458 A | 4/1996 | Campbell et al. | |
| 5,515,763 A * | 5/1996 | Vandervoort | 400/483 |
| 5,560,724 A | 10/1996 | Iwasa et al. | |
| 5,582,375 A | 12/1996 | Martin | |
| 5,610,602 A | 3/1997 | Hargreaves | |
| 5,673,040 A | 9/1997 | Hargreaves | |
| 5,689,253 A | 11/1997 | Hargreaves | |
| 5,735,619 A | 4/1998 | Myint | |
| 5,899,616 A * | 5/1999 | Caplan | 400/488 |
| 6,005,496 A | 12/1999 | Hargreaves | |
| 6,183,149 B1 * | 2/2001 | Caplan | 400/488 |
| 6,278,442 B1 * | 8/2001 | Griffin et al. | 345/168 |
| 2003/0063070 A1 * | 4/2003 | Kang | 345/168 |

OTHER PUBLICATIONS

"Ergonomic Keyboard Eases Typing Strain," Jeff Angus, InfoWorld, Mar. 1, 1993.

"Kinesis' Ergonomic Keyboard Relieves the Strain on Sore Wrists," Abigail Crane, Kinesis Corporation Promotional Brochure, 1995, 1996.

Page from Colani Catalogue.

* cited by examiner

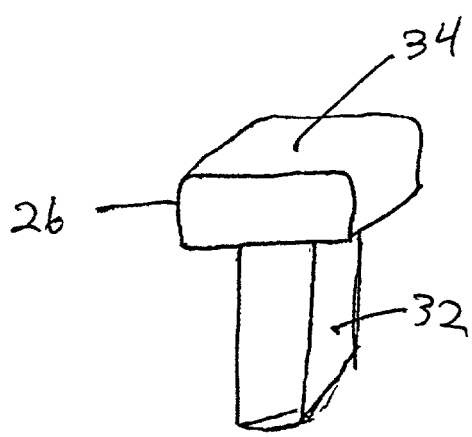
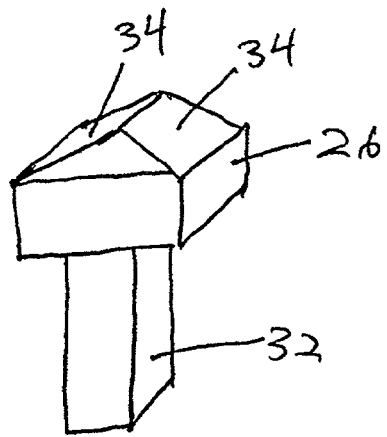
*Fig. 3A*   *Fig. 3B*
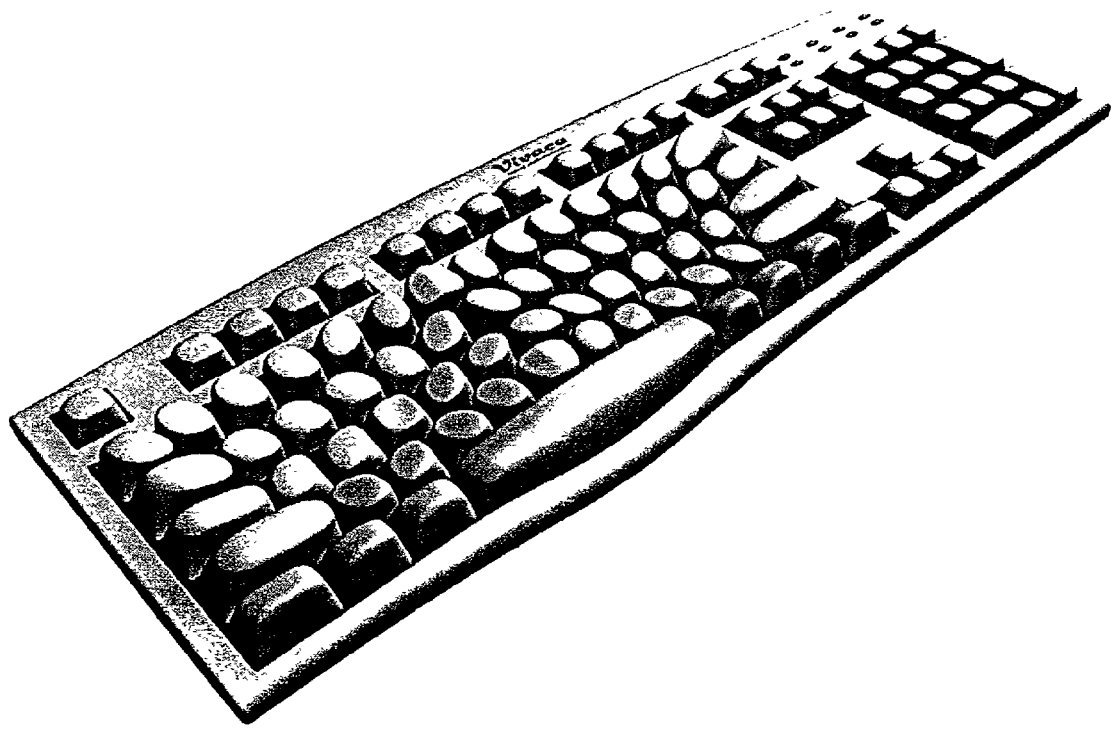
*Fig. 4*

KEYBOARD CONTOURED TO THE NATURAL SHAPE OF THE HAND

CROSS-REFERENCE TO RELATED APPLICATIONS

This application is a continuation-in-part of U.S. Ser. No. 09/229,649 filed on 13 Jan. 1999, now U.S. Pat. No. 6,183,149, which is a continuation-in-part of U.S. Ser. No. 08/957,964, filed on Oct. 21, 1997, now U.S. Pat. No. 5,899,616, all of which are incorporated herein by reference in their entirety for all purposes.

STATEMENT AS TO RIGHTS TO INVENTIONS MADE UNDER FEDERALLY SPONSORED RESEARCH AND DEVELOPMENT

Not Applicable

FIELD OF THE INVENTION

The present invention relates to keyboards, and in particular to an ergonomic keyboard designed to minimize stress and injury related to carpal tunnel syndrome and other repetitive strain injuries.

BACKGROUND OF THE INVENTION

Incidents of Repetitive Strain Injuries (RSI), for example Carpal Tunnel Syndrome (CTS), are increasing at an astronomical rate, affecting nearly two million workers annually and costing an estimated $20 billion per year in workers' compensation, medical benefits, and lost wages. RSI to the upper extremities results, in part, from the repetitive reaching, stretching, bending, flexing, and twisting of fingers. Maintaining the wrist in an awkward position during these repetitive motions increases the likelihood of injury. Over time, these awkward repetitive motions can inflame soft tissue, creating pressure on various nerves and causing pain, numbness, and tingling sensations in the upper extremities. Unless treated, RSI may result in pain, numbness, weakness, and loss of dexterity due to pressure on the median nerve.

The group most affected by RSI is keyboard operators such as secretaries, data entry personnel, computer programmers, call center customer service employees, and journalists. From the standpoint of typing speed, keyboards have advantageously evolved to the point where pauses in typing, formerly required in older model typewriters for carriage returns, paper feeds, and manual error corrections, are no longer required. While disadvantageous from an efficiency standpoint, these typing pauses significantly reduced strain and fatigue on the fingers, wrists, lower arms, upper arms, shoulders, neck, and back. Consequently, this reduced the occurrence of CTS and other repetitive strain injuries.

Despite the increased efficiency of the keyboard, the evolution of the keyboard from an ergonomic and health standpoint has been largely overlooked. With a conventional keyboard, the palms "float" in the air or rest on the desk in front of the keyboard and the wrist and fingers bend upward to depress the keys. Consequently, the muscles and tendons in the lower arm, neck, and shoulders must continually support the fingers at this upward angle to prevent the fingers from inadvertently striking the keys. Maintaining this position while typing for an extended period of time can strain the muscles and tendons of the lower arm, neck, and shoulders and significantly contributes to CTS and other repetitive strain injuries.

Additionally, many keyboards today have a non-linear relationship between the force applied to a key relative to the downward distance a key travels during a key stroke. That is, in order to prevent inadvertent key striking, many keyboards require a relatively large force to initiate a key stroke, but require a relatively small force on the keyboard key for the remainder of the stroke. The result is that often a greater force than necessary is applied to a key during the latter portion of the key stroke, and the abrupt end of the stroke results in an impact or shock on the fingers. While this effect is relatively insignificant in striking a single key, the cumulative effect of these forces and shocks from continuous typing can aggravate nerves and soft tissue in the upper extremities to the point that CTS and other repetitive strain injuries can occur.

SUMMARY OF THE INVENTION

This invention provides novel keyboards comprising keys disposed such that they minimize the distance a finger typically must travel to effect a keystroke and the force that is applied to effect a keystroke. Accordingly the keyboards require less arm and finger movement to and thereby reduce the likelihood of an operator developing a repetitive stress injury (RSI).

In preferred embodiments, the keyboards of this invention exploit the fact that the average human hand has fingers of different lengths. Consequently the keys are disposed to place their striking faces closer/more accessible to shorter and/or weaker fingers than the corresponding keys in conventional keyboards. Because the fingers in the center of a hand tend to be longer than the distal fingers, in preferred embodiments the keys reached by the distal fingers are raised relative to the keys struck by the proximal (middle) fingers. Consequently, in certain embodiments, the keys actuated by a particular hand are disposed in a generally concave or bowl-shaped configuration.

Thus, in one embodiment, this invention provides a keyboard comprising a plurality of keys disposed such that the alphanumeric keys form a continuous key array defining a key array surface having at least two concave (e.g. bowl-shaped) regions. In preferred embodiments, a plurality of keys comprising a concave region in the key array are not stepped. More preferably a plurality of keys comprising the keyboard are sloped.

In one preferred embodiment the "K" and or the "D" keys lowest point of one the concave region(s). In one embodiment, the "K" and "D" keys have the lowest striking faces of all of the letter keys.

In certain embodiments, striking faces of the keys are disposed at varying heights such that the faces in a home row typically struck with the pinky are higher than keys in a home row typically struck by the middle finger; the angle and/or slope of the striking faces of the keys varies with the location of the keys in the keyboard; and the planar projections of the striking faces of a plurality of keys comprising the keyboard are not rectilinear (more preferably rectangular, and/or not circular, and/or not square, and/or not L-shaped). In certain embodiments, no keys comprising the keyboard are square, rectangular, circular, or L-shaped.

In some preferred embodiments, the planar projection of the striking faces of a plurality of keys comprising the keyboard are substantially ovoid. The lateral offsets of the keys may vary with their location in the keyboard. Thus a row of keys in the keyboard may comprise three or more letter keys (preferably four or more letter keys, and more preferably five or more letter keys) the striking faces of which have different lateral offsets. Similarly, the rear or forward offsets of the keys (e.g. the key pillows) may vary with their location in the keyboard. Thus a row of keys in the keyboard may comprise three or more letter keys (preferably four or more letter keys, and more preferably five or more letter keys) the striking faces of which have different forward and/or rearward offsets.

In addition, the orientation (e.g. the slope and/or angle) of the striking faces of the keys may vary, e.g. along a row. Thus a row of keys in the keyboard may comprise three or more letter keys (preferably four or more letter keys, and more preferably five or more letter keys) the striking faces of which have different orientations (e.g. angles and/or slopes).

In certain embodiments, the orientation of the major principal axis of the striking faces of the keys in a row varies with the position of the keys in said row.

In certain embodiments, the keyboard comprises one or more keys having two or more striking faces.

In one particularly preferred embodiment, the planar projection of the striking faces of a plurality of keys comprising the keyboard are not square, not circular, not L-shaped, and not rectangular, and the orientation (e.g. the slope and/or angle) of the striking faces of the keys varies along a row. In certain preferred embodiments, keys in the row above the home row have surfaces angled downward toward the home row so as to physically position the keys closer to the pinky and ring fingers and/or keys in the row below the home row have surfaces angled upward toward the home row so as to physically position the keys closer to the pinky and ring fingers.

In preferred embodiments, the vertical distance between the lower-most striking face of a key comprising one of said concave regions and the uppermost striking face of a key on the keyboard is at least about 2 mm, preferably at least about 5 mm, more preferably at least about 8.5 mm, most preferably at least about 10 mm, 15 mm or even 20 mm. Conversely, in certain embodiments, the vertical distance between the lower-most striking face of a key comprising one of said concave regions and the uppermost striking face of a key on the keyboard is at less than about 30 mm, preferably less than about 20 mm, more preferably less than about 15 mm, and most preferably less than about 10 mm. A particularly preferred height range is from about 1 to about 10 mm with a most preferred distance being about 8.5 mm.

In certain embodiments, the keys comprising a concave region in said key array have striking faces oriented such that lines normal to the striking faces of at least two, (preferably at least three, more preferably at least four, and most preferably at least five or six) keys all point in different directions, e.g., orientations (e.g. slopes and/or angles) are all different.

A key comprising one of said concave regions may have a key face rotated to substantially align with the key array surface within one of said concave regions and a key array preferably comprises at least two (preferably at least three, more preferably at least four, and most preferably at least five or six) keys having different angles and/or slopes from each other.

In one particularly preferred embodiment the key array comprises a key, preferably a plurality of keys, having a striking face the planar projection of which describes an ellipse.

In certain embodiments, the major axis of the keys (e.g., particularly the major axes of elliptical keys) are directed diagonally generally toward the center of keyboard and/or diagonally generally toward the center of a "concave" region. In certain embodiments, the key array comprises a key comprising a striking surface having an angle and a slope such that the surface of the striking face is not generally parallel to the keyboard surface, but is oriented generally perpendicular to the line of action of a finger striking said face when a users hands are positioned in home position and the finger used to strike said key is the finger used in a standard touch typing system.

The keys comprising a keypad preferably have a center to center spacing ranging from 0.25 inch to about 1.5 inches, more preferably from 0.5 inches to 1.0 inches, and most preferably have a "standard" spacing (e.g. 0.75 inch).

The key faces of the keys may also vary. Indeed, the key faces of keys other than selector keys may vary. Thus, in certain embodiments, letter or punctuation keys struck by the fifth finger have a larger striking face than the striking face of keys struck by the first (index) finger in a standard touch typing system.

In certain embodiments, the shape of the keys varies such that the distance between the edges of the striking faces of two adjacent keys varies along said edges. In certain keyboards, the key array comprises a row of keys in which each key in said row has a single topmost point and/or each key has a single bottom-most point, and the spacing topmost points or the bottom-most of the keys in the row may not be constant.

Rows of keys may comprise different keys having forward extent and/or rear and/or side extents. A plurality of keys may also have an off-center axis.

In preferred embodiments, the edges and/or corners of the keys are rounded. Preferred "rounds" range from about 0.005 to about 0.5 inch, with particularly preferred rounds ranging being softer than about 0.02 inch. The "skirts" of the keys (e.g. the sides of the key pillows) are typically uniform, however, in certain embodiments, they are not uniform. Certain preferred keyboards comprise keys having striking faces that are substantially elliptical in shape.

In another embodiment, this invention provides an keyboard comprising at least one key (more preferably at least two keys, most preferably at least three or four keys) having at least two striking faces. One preferred such keyboard is a computer keyboard. In particularly preferred embodiments, the key(s) comprising at least two striking faces are character keys and/or selector keys.

In another embodiment, this invention provides keys for the fabrication of such a keyboard. Thus, this invention provides a key for an electronic keyboard, where the key comprises at least two striking faces. In preferred embodiments, the key for a computer keyboard. In more preferred embodiments, the key is a character key or a selector key.

Also provided are kits for the fabrication or modification of a keyboard. Preferred kits comprise a plurality of keys or key pillows sufficient to produce a keyboard as described herein. Preferred key pillows are shaped to slip over a key of a keyboard or shaped to affix to the striking faces of keys of a keyboard. The kit typically comprises a plurality of keys one or more of which, optionally, comprise two or more striking faces. Preferred kits also include instructional materials describing the use of the keys or key pillows to alter a keyboard and/or the keys to assemble a keyboard.

In one embodiment this invention provides a key for a keyboard (e.g., for use in an electronic keyboard), where the key comprises a key pedestal, and a key pillow where the key pillow comprises two or more striking faces.

In another embodiment this invention provides a key for a keyboard, where the key comprises a key pedestal and a key pillow where the key pillow is shaped to provide a striking face that is not horizontal and not vertical when the key is present in a keyboard and where the striking face has a single topmost point.

Definitions

A "key array surface" refers to a surface generally defined by the striking faces of a plurality of keys comprising a keyboard (key array). Such a surface may be visualized as a surface that would be created by adhering a continuous flexible polymer or membrane to the striking faces of all the keys comprising the key array or subsection thereof of interest. The heights and orientations of each striking face determine the height and orientation of the key array surface at that location. As the membrane traverses the space between one key and the next, the location of the membrane defines a surface spanning the gaps between the keys.

A "concave region" or a "bowl-shaped" region refers to a region of the key array surface that is concave or bowl-shaped. The concave region is typically created by keys whose striking faces are disposed at varying heights above the surface on which the keyboard rests such that certain keys have striking faces situated at heights lower than the heights of the striking faces of surrounding keys (see, e.g., FIG. 1A).

The front of a keyboard refers to the edge of the keyboard closest to the user when the user is seated in a typing position. The "rear" of a keyboard refers to the edge of a keyboard farthest away from the user when the user is seated in a typing position. The "left" and "right" sides of the keyboard refer to the left and right edges of the keyboard as seen by a user seated in a typing position.

The term "character key" refers to a key that, when present in a keyboard and depressed, ultimately produces or signals a representation (e.g. an electronic or mechanical representation) of a letter of the alphabet (e.g. small or capital "a" through "z" in an English alphabet). The key may bear a representation of the character it signals. A character key is a key typically used to type sentences. Generally a key array consisting of "character" keys excludes a numeric key or a cursor key. It is recognized that in one embodiment, a character key pad includes keys for substantially all the characters of an alphabet. The character keypad can, in some embodiments, additionally and optionally include punctuation keys and/or keys encoding symbols and/or keys encoding numbers.

The term "punctuation key" refers to a key that, when present in a keyboard and depressed, ultimately produces or signals a representation (e.g. an electronic or mechanical representation) of a punctuation mark (e.g. ".", ",", ";", "?", "'", "''", etc.). The key may bear a representation of the punctuation mark it signals.

The term "number key" refers to a key that, when present in a keyboard and depressed, ultimately produces or signals a representation (e.g. an electronic or mechanical representation) of a number (e.g. "0", "1", "2", "3", "4", "5", "6", "7", "8", "9"). The key may bear a representation of the number it signals.

The term "selector key" refers to a key that, when present in a keyboard and depressed, ultimately produces or signals a selection of a particular character, number, or punctuation subset, or signals some action. Typical selector keys include, but are not limited to "tab", "caps lock", "num lock", "alt", "enter", "ctrl", "arrow", and the like. The key may bear a representation of the action or selection it signals.

The orientation of the striking face of a key is characterized by an "angle" and a "slope". The "angle" of the striking face refers to the orientation of the striking face when the key is viewed from the front of the keyboard. Thus the angle of the striking face determines the left-right slope of the striking face of the key. The "slope" of the striking face of a key refers to the orientation of the striking face when the key is viewed from the side of the keyboard. Thus the slope of the striking face determines the front-back slope of the striking face of the key.

The "planar projection of the striking face of a key" refers to the projection of a striking face of a key on a surface, preferably as viewed along a line generally normal to the striking face of the key.

"Highest" or "lowest" with respect to a key indicates the position of the striking face of the key with respect to the surface upon which the keyboard rests. The highest key in a set of keys refers to the key in that set whose striking face is the greatest distance away from the surface upon which the keyboard rests. Conversely, the lowest key in a set of keys refers to the key in that set whose striking face is the smallest distance away from the surface upon which the keyboard rests.

A "forward offset" of a key or the "forward offset of the striking face" of a key refers to the distance forward that a key or the striking face of a key extends. This may be with reference to the center of the key, with reference to the center of a key pedestal, and most preferably is with reference to a line passing generally through the middle of a row of keys. Thus a key having a greater forward extent than another key in that row typically has a striking face that extends farther forward in the keyboard than a key in the same row having a lesser forward extent. Conversely, a key having a greater rear extent or a greater rearward extent than another key in that row typically has a striking face that extends farther to the rear of the keyboard than a key in the same row having a lesser rearward extent.

"Lateral extent" or "lateral offsets" refers to the distance to the left or right that a key or the striking face of a key extends. Left offset refers to extension of the key or striking face to the left (when facing the keyboard) and right offset refers to extension of the key or striking face to the right (when facing the keyboard).

A "regular polygon" refers to a polygon having equal sides, and the angles between these sides are equal.

The differences between a "sloped" and a "stepped" keyboard are illustrated in FIG. 1A ("sloped") and FIG. 1B (stepped). In a stepped keyboard, the keys in adjacent at different heights have their striking faces oriented in substantially the same direction. Consequently the surface defined by the striking faces of keys at different heights is stepped, much like a stair-step (see, FIG. 1B). Thus, for example, in a "conventional" keyboard each row of keys is lower than the row behind it and all the keys in a row are typically the same height (the striking faces are at the same height). Seen from the side the rows are like stair steps. In contrast, in a "sloped" surface, the surface (e.g. the key array surface) defined by the key-faces is a substantially continuous surface.

An "alphanumeric keypad" refers to a keypad comprising character keys and number keys.

A "key array" refers to a collection of keys in a keyboard. The key array is said to be "continuous" where the keys are in a generally uniform spacing, i.e., there are no clear and significant gaps (e.g. greater than ½ row width, preferably greater than 1 row width, more preferably greater than 1.5 or 2 row widths) lacking keys. A "split" keyboard or a split key array typically has a clearly delineated gap in the key pad thereby forming two discrete keypads.

A "standard touch typing system" refers to a touch typing system based on a QWERTY keyboard, e.g. typically using an English keyboard. A standard touch typing system can also refer to a touch typing system based on a non-English keyboard.

A key that has an "off-center axis" refers to a key in which the center of the pedestal is not co-aligned with the center of the striking face of the key.

A key that has "a single topmost point" is a key that has a striking face shaped such that the perimeter of the striking face has a single point is disposed closest to the rear of the keyboard. A key that has a "horizontal rear edge" (e.g. a square or rectangular key) does not have a single point disposed closest to the rear of the keyboard. A key that has a single "lower-most or bottom-most point" is a key that has a striking face shaped such that the perimeter of the striking face has a single point is disposed closest to the front of the keyboard.

A "non-rectilinear key" refers to a key in which a striking face (the planar projection of a striking face) has at most one straight edge, and more preferably has no straight edges.

An "irregular key" refers to a key whose striking face (the planar projection of the striking face) is not a regular polygon.

The term "home row" refers to the row of the keyboard over which the index fingers are oriented in the basic/reference position. The home row of a QWERTY keyboard is typically the row containing the letters "F, and "J" (sometimes referred to as the "home keys").

BRIEF DESCRIPTION OF THE DRAWINGS

FIG. 1A and FIG. 1B illustrate a cross-section of a key row showing the "bowl" shaped configuration of keys formed by a set of keys typically struck by one hand. For the purpose of clarity, the relative heights of the key pillows are exaggerated to FIG. 1A illustrates a "sloped" configuration, while FIG. 1B illustrates a "stepped" configuration.

FIG. 3A and FIG. 3B illustrates two keys showing the key pillow 26, the key pedestal 32, and the striking face 34. FIG. 3A illustrates a key having a single striking face 26, while FIG. 3B illustrates a key having two striking faces 26.

FIG. 4 is a perspective view of a keyboard according to the present invention.

DETAILED DESCRIPTION

Figure 1A:
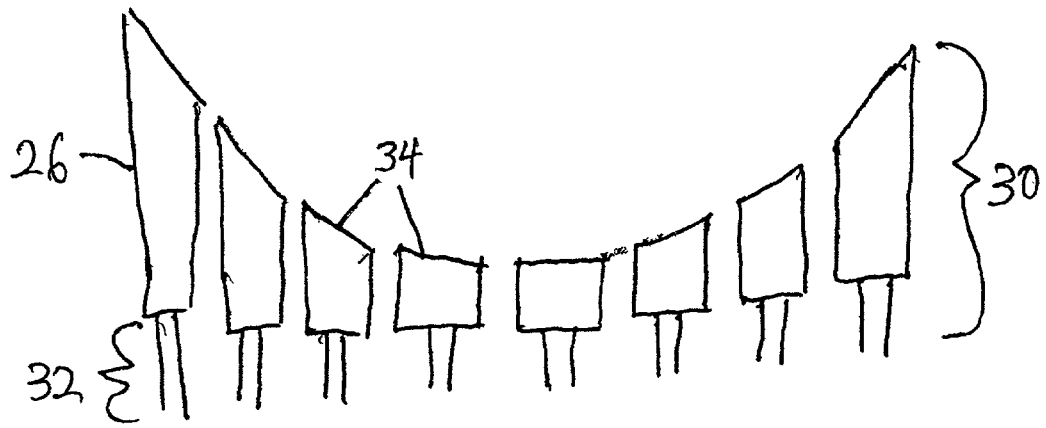
Figure 1B:
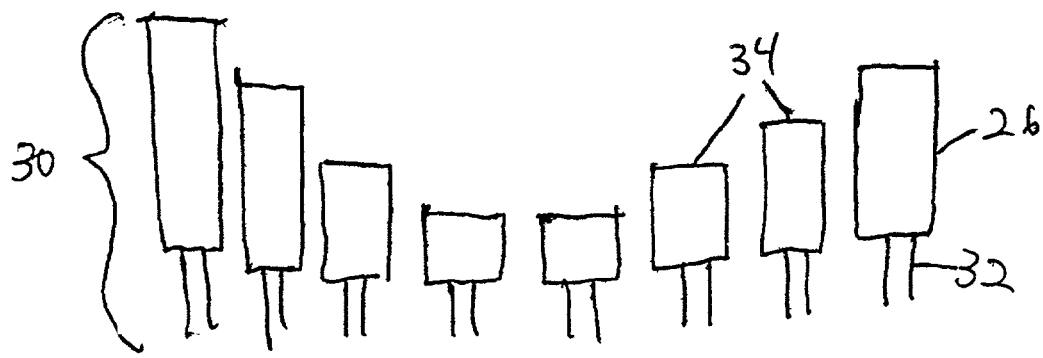

This invention provides novel keyboards comprising keys disposed such that they minimize the distance a finger typically must travel to effect a keystroke and the force that is applied to effect a keystroke. Accordingly the keyboards require less arm and finger movement to and thereby reduce the likelihood of an operator developing a repetitive stress injury (RSI).

The invention, in one embodiment, is generally described with reference to FIG. 1 through FIG. 8 which typically depict a keyboard 20 having a length and width approximating that of a conventional full-sized keyboard (e.g., approximately 20 inches by 8 inches). Other dimensions may be used in alternative embodiments. The keyboard 20 may have a standard or non-standard keyboard layout of alphanumeric keys. One preferred embodiment comprises a standard QWERTY layout. Another preferred embodiment comprises a standard Dvorak layout. Common commercial adaptations of the standard layout include the AT keyboard layout, XT keyboard layout and APPLE MACINTOSH® IMAC® keyboard layout. Non-standard keyboard layouts include for example splitting the standard layout into two halves, angled with respect to each other, such as for example the Natural Keyboard manufactured by MICROSOFT® Corporation and others. It is understood that the present invention may be adapted to work with any of the various known keyboards. Additionally, it is contemplated that the present invention may be used on keys of other devices, including but not limited to, musical instruments, cash registers, calculators, adding machines, telephones, laptop computers, notebook computers, medical devices, and stenographic machines.

The keyboards of this invention are designed in accord with the natural shape of a human hand. In a typical human hand, the fingers are of different lengths, the middle finger, for example, being longer than the little finger (pinky). In preferred embodiments, the keys in the keyboards of this invention are disposed such that the distances that must be traveled by shorter fingers to effect a keystroke are reduced. Thus, in preferred embodiments, the striking faces of keys struck by the little finger or fourth finger are closer (to the center of the hand in a standard touch-typing position) than in typical keyboards.

Conversely, the key faces typically struck by longer fingers (e.g. the middle finger) may be farther away (from the center of the hand) than the keys struck by the shorter fingers. In addition, the striking faces of the keys are oriented to optimize the angle of the key face(s) relative to the striking finger(s) (e.g. to place the striking face normal to the line of action of the finger) thereby improving the efficiency and ease of a key strike. As a consequence, the keyboards of this invention offer greater comfort, require substantially less finger and arm movement, and thereby reduce the likelihood of developing a repetitive stress disorder associated with keyboard use.

Figure 2:
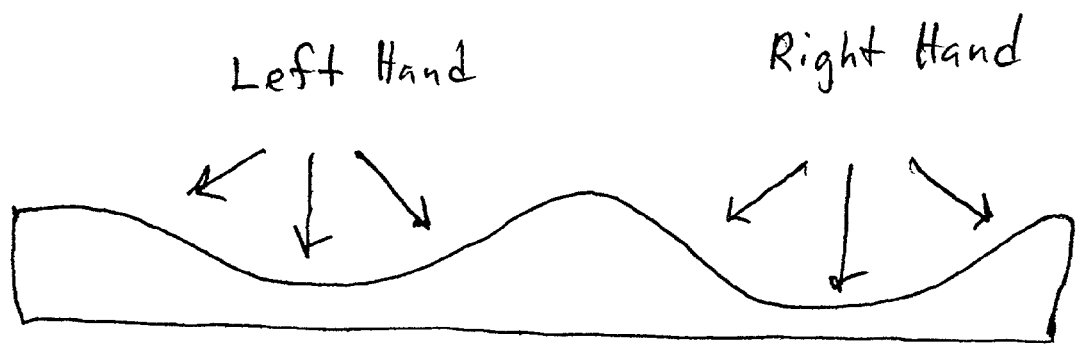
FIG. 2 illustrates a surface defined by the keys forming a dual bowl-shaped (wave-shaped) configuration of a keyboard.

Because the fingers in the middle of a typical human hand are longer than the fingers at the periphery, in preferred embodiments, the striking faces of the keys struck by peripheral fingers, (e.g. the first finger and the pinky) will be raised relative to the striking faces struck by the middle fingers. Consequently, in certain embodiments, the set of keys struck by a particular hand will tend to form a bowl-shaped configuration. That is, if the striking faces of the keys are regarded as defining a surface (e.g. as if one were to stretch a plastic film over the surface of the keys), that surface would achieve a generally bowl-shaped (concave) configuration (see, e.g., Figure A and B). In the case of a right hand configuration, for example, the "K" key (in a QWERTY keyboard) might form the bottom (low point) of the bowl, while keys such as the "P" or "bracket keys" might form a high edge of the bowl. In certain embodiments, the "numeric" keys or key in the "top" row might form high edge of the bowl.

Where a keyboard incorporates keys for use with both hands, in embodiments, the keys used by each hand will preferably form a bowl-shaped configuration resulting in two bowl-shaped configurations in a single keypad thereby giving rise to a "wave-shaped" configuration (FIG. 2). Thus, the keys in any particular key row are preferably at different heights (e.g., any row contains at least 2 keys, preferably at least 3, keys, more preferably at least 4 keys, and most preferably at least 5 keys at different heights). Where the keyboard is split, e.g. the keys serviced by the left hand are in a keypad separate from the keys serviced by the right hand, each side of the "split" will preferably form a single bowl-shaped configuration. Similarly, a separate numeric keypad or telephone keypad, etc. will also preferably form a separate bowl-shaped configuration.

In a particularly preferred embodiment, the keys of the keyboard, although at different heights, have the faces angled such that the keyboard (keyfaces) form a sloped configuration (see, FIG. 1A). That is the surface defined by the key-faces is a substantially continuous surface. This is in contrast to the typical "stepped" configuration where keys at different heights have their striking faces oriented in substantially the same direction. Consequently the surface defined by the striking faces of keys at different heights is stepped, much like a stair-step (see, FIG. 1B). Thus, for example, in a "conventional" keyboard each row of keys is lower than the row behind it and all the keys in a row are typically the same height (the striking faces are at the same height).

As illustrated in FIG. 3 the keys 30 used in the keyboards of this invention preferably comprise a key pedestal 32 and a key pillow 26. It is recognized in some embodiments, however, that the key pillow and key pedestal may be essentially continuous and indistinguishable. The key pillow typically provides one or more striking faces 34. The key pillow allows the keys to vary in shape and affords a comfortable mass to the key. The use of a key pedestal distinct from the key pillow allows the key pillow to communicate with the electronic actuator(s) (the switch(es) that transform the mechanical action of the key into an electrical contact) through a uniform series of apertures in the keyboard base while the key pillows vary in shape. The varying height(s) of the keys can be achieved by varying the heights of the key-pillows and/or by varying the heights of the key pedestals, and/or by varying the height of the actuator surface(s) upon which the key pedestals rest.

In particularly preferred embodiments, another feature that improves the comfort and efficiency of the keyboards of this invention is the use of "irregular" keys. In preferred embodiments, the keys used in the keyboards of this invention are shaped such that the striking faces differ in surface area and/or shape with keys that are more difficult to reach and keys that are struck with high frequency having larger area striding faces. In addition, in certain keys, the striking face may be offset such that the center of the striking face is disposed towards the center of the hand (when the hand is in a conventional touch typing position). In such instances, the center of the striking face may not be over the center of the key pedestal.

While "traditional" (e.g. the IBM "standard") keyboards have keys of different shape, the "unusual shaped" keys are limited to "selector" keys (e.g. ctrl, shift, tab, alt, caps lock, etc.), the space bar, and the "enter" key. Typically the remaining keys (e.g. character keys and/or number keys) all have the same shape.

In preferred keyboards of this invention the shape and/or angle and/or slope of the striking face of the key may vary with the position of the key in a particular row. Thus, in certain embodiments, this invention contemplates keyboards that have at least two character keys, preferably at least three character keys, more preferably at least four character keys, and most preferably at least five character keys of different shape in a given row. In certain embodiments, multiple character keys may have the same general shape (e.g. all ovoid), but have key faces that are oriented in substantially different directions (see, e.g. FIG. 4). Such keys are regarded as having different shapes.

In particularly preferred embodiments, a plurality (e.g. more than three, preferably more than four, more preferably ten or more, and most preferably fifteen or more) of the keys, more preferably the character keys and/or the number keys, comprising the keyboard are generally non-rectilinear or irregular, and most preferably are non-rectilinear and irregular. A non-rectilinear key refers to a key in which a striking face (the planar projection of a striking face) has at most one straight edge, and more preferably has no straight edges. An irregular key refers to a key whose striking face (the planar projection of the striking face) is not a regular polygon.

In certain preferred embodiments, a number of the keys are elongate in one direction (e.g. ovoid) and/or generally asymmetric. The striking faces (the planar projections of the striking faces) of such keys are typically characterized by a major and a minor axis that are of different lengths. The major axis is the axis (line) through the two points along the edge of the striking face (along the edge of a planar projection of the striking face) that are farthest away from each other. The minor axis is the axis normal to the major axis that passes through the midpoint of the major axis. Often the elongate or "asymmetric" keys are oriented such that the orientation of the major axis varies with the position of the key in a particular row. In preferred embodiments, the major axis is oriented so that it is generally oriented towards the center of the "bowl" shape discussed above. Thus for example keys disposed towards the center of a keyboard may have a principle axis oriented, diagonally towards an outside edge, while keys disposed towards an outside edge may have a principle axis generally oriented towards the center of the keyboard. Thus, for example, in another perspective view of a keyboard according to the present invention.

Figure 6:
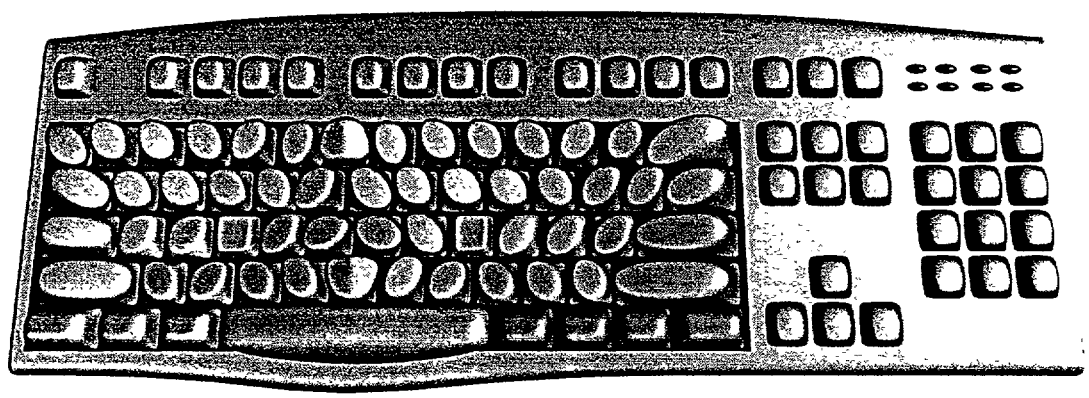
FIG. 6 is a top view of a keyboard according to the present invention.

FIG. 6, the principle axes of the three rightmost keys in the third row from the back of the keyboard are oriented from front left to rear right, while keys four through eight of that same row have their principle axes oriented from front right to rear left.

Figure 5:
FIG. 5 is another perspective view of a keyboard according to the present invention.

As indicated above, and illustrated in FIG. 4 and FIG. 5, in preferred embodiments, the faces of the keys are generally canted to present a face generally normal to the line of action of a finger striking the key. In this manner the greatest force is delivered to the key face and minimal effort is required to activate the key.

Some keys may be struck by fingers (thumbs) of either hand in standard touch typing systems. A strike from the thumb or forefinger of the right hand will have a very different line of action than a strike from the thumb or forefinger of the left hand. In certain preferred embodiments, it is desirable to have one or more keys (e.g. at least one key, preferably at least two keys, more preferably at least 3 keys) with two or more striking faces oriented in different directions (see, e.g., FIG. 3B and FIG. 5). Such keys man include one or more keys selected from the group consisting of the "B" key, the "N" key, the "G" key, the "H" key, the "T" key, the "Y" key, the ""5", "6" or "7" keys in the standard QWERTY layout or other keys, preferably in equivalent positions on the keyboard.

In particularly preferred embodiments, to improve comfort, particularly when the keys are struck "off center" the keys have rounded corners and edges. Particularly when embodied in non-rectilinear and/or irregular keys, this provides a so called "organic" look and feel reported as desirable by testers. In preferred embodiments, the keys, particularly the key pillows have rounds softer than (i.e. a radius of curvature greater than 0.01 inch, preferably softer than 0.02 inch, more preferably softer than 0.03 inch, and most preferably softer than 0.05 inch.

Referring now to FIG. 4, FIG. 5, another perspective view of a keyboard according to the present invention.

Figure 7A:
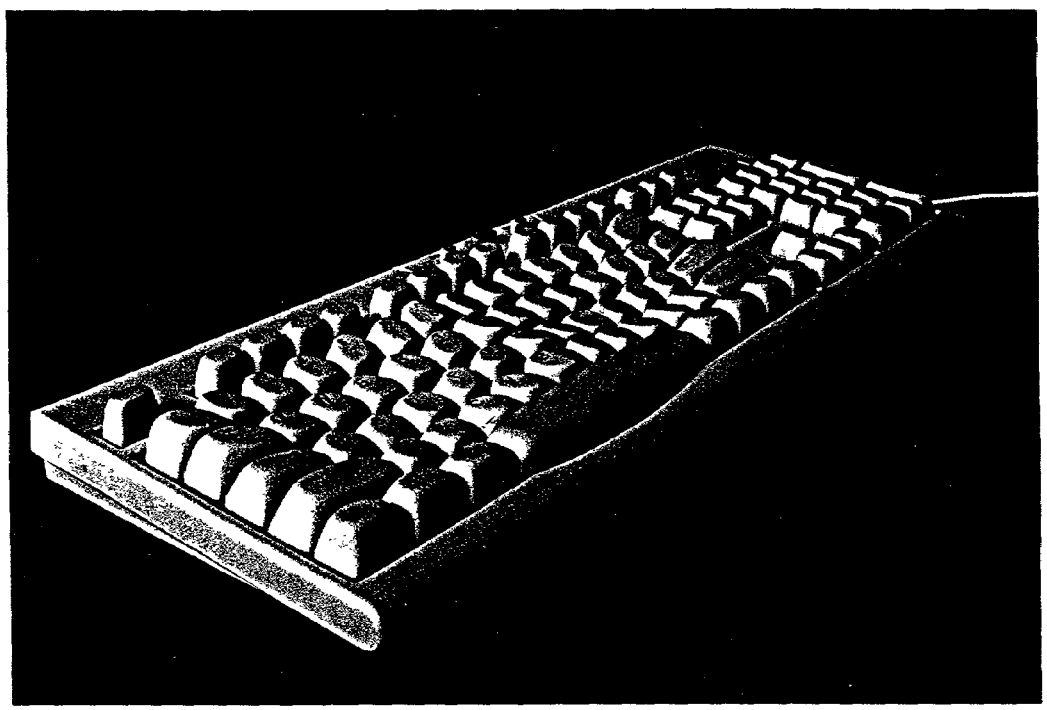
FIG. 7A, FIG. 7B, and FIG. 7C show photographs of one particularly preferred embodiment of a keyboard of this invention.
Figure 7B:
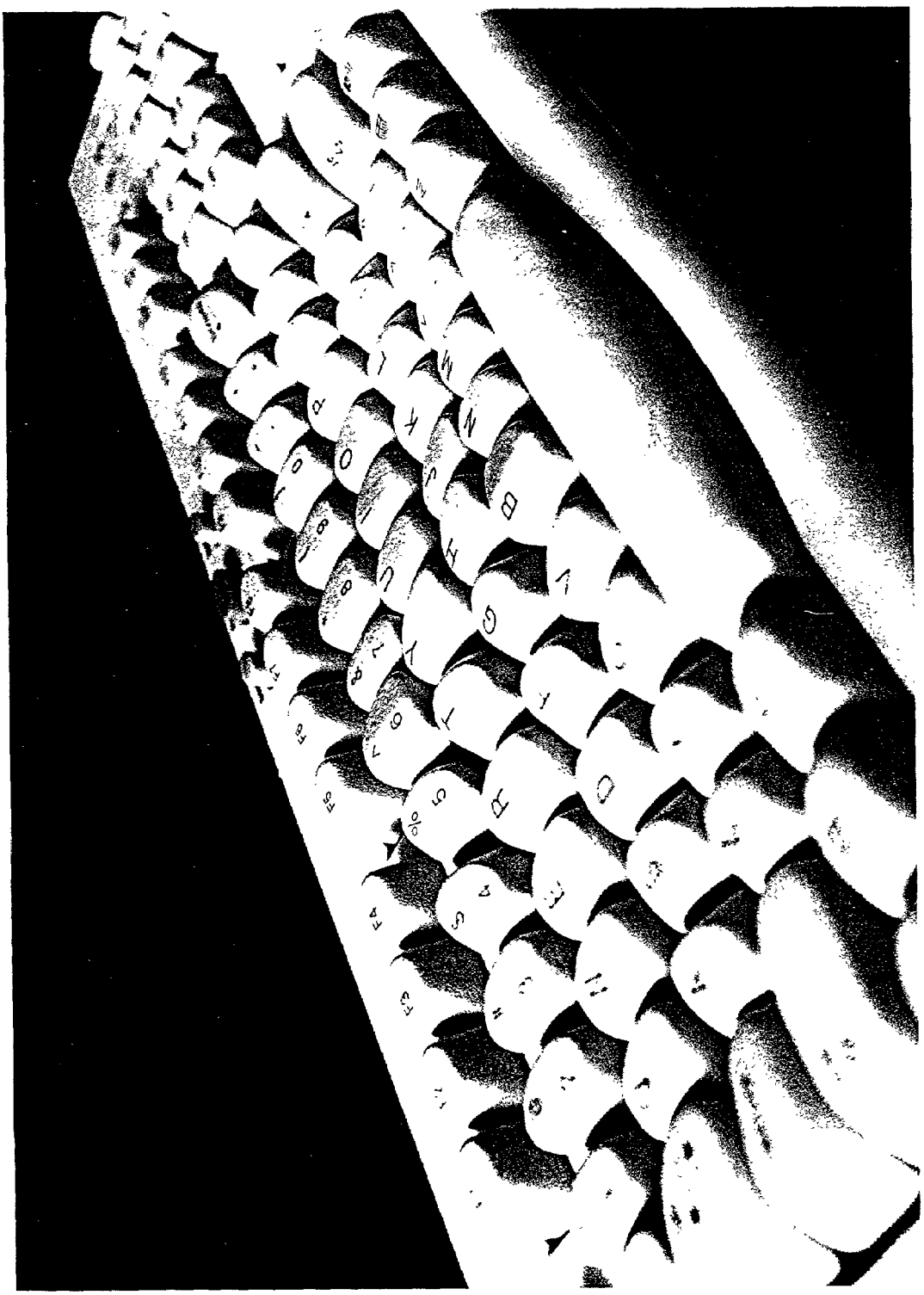
Figure 7C:
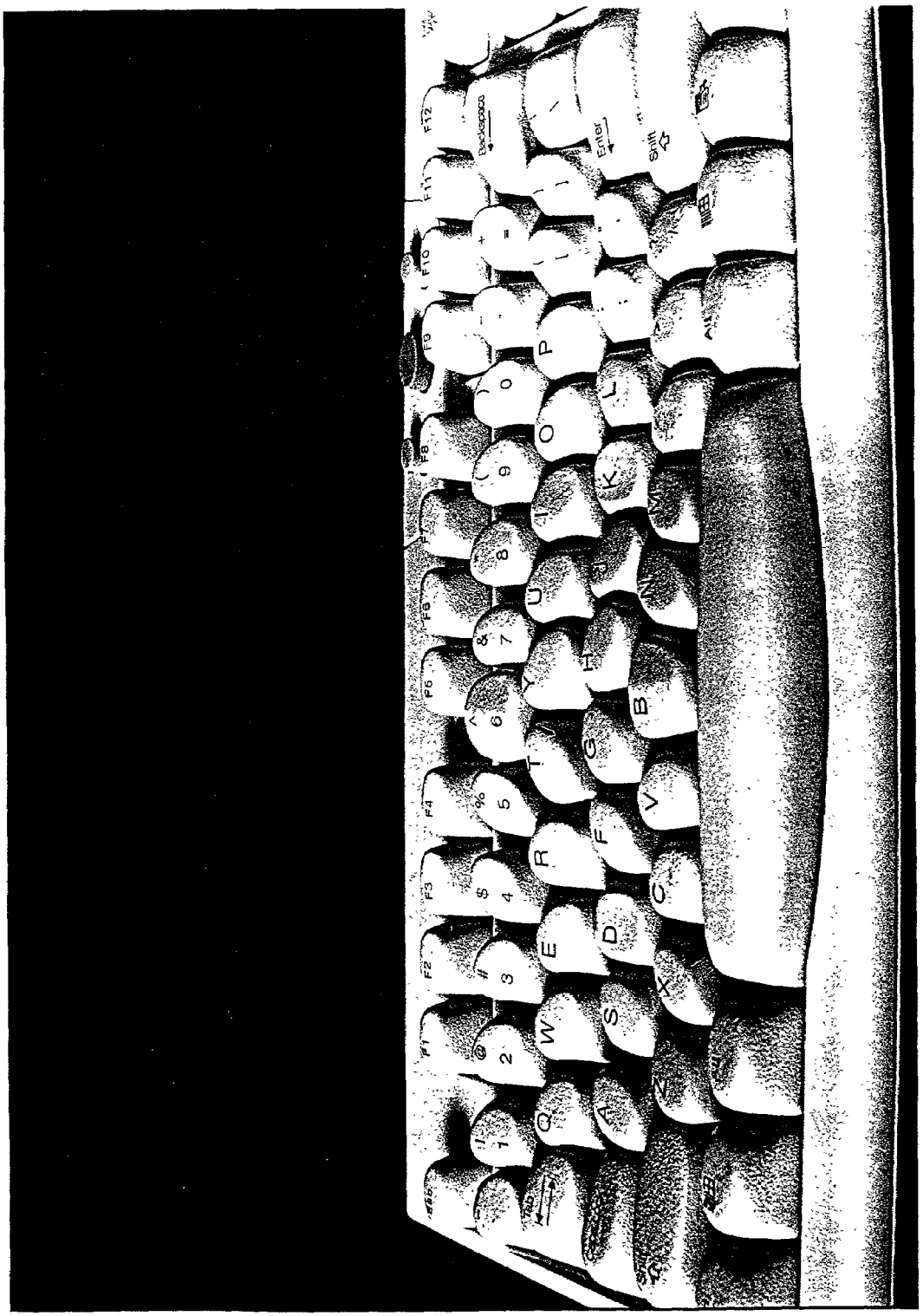

FIG. 6, and FIG. 7 which illustrate various preferred embodiments, there is shown a keyboard 20 including keys 30. Typical keys 30 comprise a key pillow 26 and a key pedestal 32 and the key pillow may form one or more striking faces 34. The key heights vary along a row such that the keyboard forms two "bowl-shaped" configurations one bowl generally corresponding to the keys struck by the left and the other "bowl" generally corresponding to the keys struck by the right hand. A plurality of the character keys are irregular and non-rectilinear and the edges and corners of the keys are rounded. Keys that are typically difficult to reach and/or strike have enlarged striking faces and the keys are disposed such that the striking faces 34 of the keys are canted towards the fingers that would be used to strike them in a standard touch typing system. In addition, the keys are disposed such that the distance traveled by a finger to effect a keystroke, particularly a "pinky" or "ring finger" is reduced as compared to a standard (e.g. flat) keyboard. While the numeric keypad illustrated in the keyboard appears substantially flat it will be appreciated that the keys comprising the numeric keypad can also be disposed in a general "bowl-shaped" configuration as well. One particularly preferred embodiment is illustrated in the photograph shown in FIG. 7.

The striking faces of the keys are generally flat. However, certain striking faces are slightly concave (e.g. to prevent the striking finger from slipping off the striking face) and certain other faces may be slightly convex to bring the striking face slightly closer to the hand.

In certain embodiments, the keyboard may comprise a plurality of distinct keypads. Thus, for example, a "split" keyboard may have the alphanumeric keypad split into two discrete keypads. Many keyboards may comprise a separate (from the alphanumeric keypad) numeric keypad. In preferred embodiments, the numeric keypad will possess many of the features discussed above (e.g. bowl-shaped configuration, and/or non-rectilinear key pillows and/or irregular key pillows, and/or rounded keys, etc.).

It is noted that, in certain embodiments, the key offsets may vary both in both a forward and a rear direction on a single key and/or in single a row, etc.

This invention also provides for isolated keys or isolated key pillows (e.g. keys and/or key pillows not incorporated into a keyboard) for the de novo manufacture of keyboards or for the modification of existing keyboards. In preferred embodiments, the keys or key pillows are provided in collections (e.g. two or more keys or key pillows) with particularly preferred collections providing sufficient numbers and types of keys to produce a keyboard according to this invention. The collections of keys may be provided to equipment manufacturers for the production of keyboards and/or to retailers and/or to end users (e.g. as kits) for the modification of keyboards. Preferred "kits" may include key pillows that can be affixed to the keys in existing keyboards, as described herein. Other preferred kits may include keys that can be used to replace the keys in an existing keyboard. Preferred kits optionally include instructional materials teaching the use of the key pillows and/or keys to modify an existing keyboard.

While the instructional materials typically comprise written or printed materials they are not limited to such. Any medium capable of storing such instructions and communicating them to an end user is contemplated by this invention. Such media include, but are not limited to electronic storage media (e.g., magnetic discs, tapes, cartridges, chips), optical media (e.g., CD ROM), and the like. Such media may include addresses to internet sites that provide such instructional materials.

Figure 9:
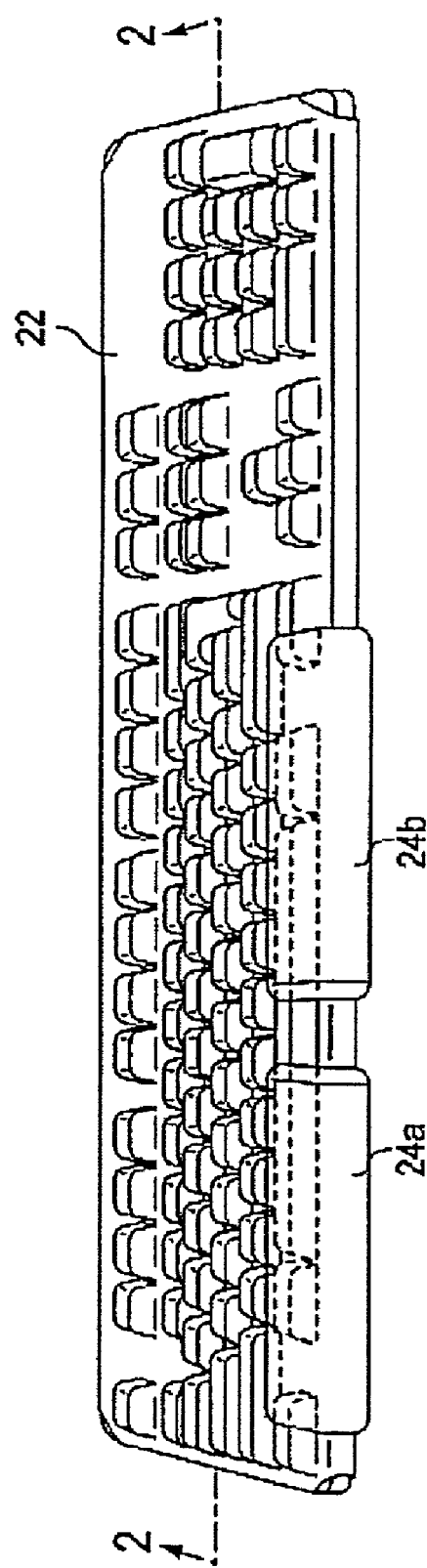
FIG. 9 is a perspective view of the keyboard having a keyboard attachment according to the present invention.
Figure 10:
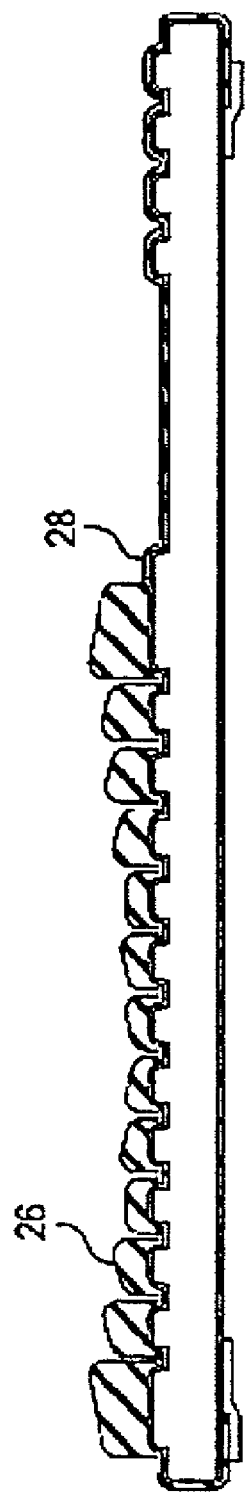
FIG. 10 is a sectional view through line 2—2 of FIG. 9.

In another embodiment, this invention pertains to a key pillow attachment 22. Referring now to FIG. 9 and FIG. 10, there is shown a keyboard 20 according to this invention including a key pillow attachment 22 affixed thereon. In certain preferred embodiments, key pillow attachment 22 includes raised pads 24a and 24b for supporting the palms, and a plurality of key pillows 26 fitting over each of the keys on the keyboard. A base material 28 may surround and attach each of the key pillows 26 and pads 24a and 24b, so that the key pillow attachment 22 forms a continuous cover over the keyboard 20. The attachment may be formed with elastic straps to hold the attachment on the keyboard. Thus, the attachment may be easily removed, cleaned, and replaced. Other known fastening systems may alternatively be used. In a preferred embodiment of the invention, the lower surface of the attachment is formed with negative impressions of the keys of keyboard 20, to enable the attachment to fit over the keyboard keys. The upper surface of the attachment includes the key pillows 26 directly over the keys of the keyboard 20, which key pillows are formed to various heights and inclinations as explained hereinafter.

In a preferred embodiment of the invention, the negative impression for each key on the underside of the attachment is formed such that the attachment extends partially over the keys of the keyboard, i.e., so that the attachment extends partially down along the vertical sides of each key. However, it is understood that the negative impression for each key on the underside of the attachment may be formed to a depth so that the attachment fits substantially entirely over the keys of keyboard 20. Moreover, in a further embodiment of the invention, the bottom surface of attachment 22 may be substantially flat, without any impressions. In this embodiment, the attachment may simply lie on top of each of the keys of keyboard 20. This latter embodiment may additionally have small brackets formed on the underside of the attachment, which brackets entirely or partially surround each key of the keyboard to assist in keeping the key pillows 26 aligned over their respective keys. Alternatively, this latter embodiment may be secured to the respective keys of keyboard 20 by an adhesive.

The attachment has thus far been described as fitting over keys of a conventional keyboard. However, in a further embodiment of the invention, the keys of keyboard 20 may be omitted. In this embodiment, a attachment with a negative impression for each post on the underside of the attachment may be formed to a depth so that the attachment may be fitted directly over the posts on which the keys are mounted in conventional keyboards. In any of the above-described keyboard and attachment embodiments, the attachment may simply rest over or on top of the keys or posts of the keyboard. Alternatively, an adhesive may be applied to the underside of the attachment so that the attachment is fixedly held in place over or on top of the keys or posts of the keyboard.

As mentioned above, the keys of a conventional keyboard may be replaced by keys having key pillows as illustrated and/or described herein. Alternatively, key pillows may be slipped on or glued (Velcro, or otherwise attached) to the tops of existing keys thereby providing new key pillows with striking face(s) as described herein. When the key pillows 26 is pushed down, the respective key switch, i.e., the electrical connection, is actuated. Where the above described attachment is used, the attachment(s) is effectively the keyboard and thereby replaces a conventional keyboard. It will be appreciated that key shape and/or positioning features obtained with the keyboard attachment 22 may also be obtained in a keyboard made with keys in accordance with this invention.

In a preferred embodiment, each of the key pillows 26 may be formed of a soft, shock absorbent material, such as, for example, silicone, rubber, latex, urethane, foam, molded and filled spandex, or any combination of these materials. It is understood that the key pillows 26 may be formed of other materials in alternative embodiments of the invention. As explained above, due in part to the larger force required to initiate a key stroke as compared to the remainder of the stroke, a greater force is applied downward on the keys by the fingers than the upward force of the keys during the latter portion of a keystroke. This results in an impact or shock to the fingers at the bottom of each key stroke. The shock absorbent material from which the key pillows 26 are formed can greatly reduce the shock received by the fingers upon initially impacting the key, and upon the key reaching the bottom of a key stroke.

Dirt, dust, liquids, or other particulates may fall between keys in conventional keyboards. The particulates may cause the keys to stick, requiring an even greater force to free and depress the keys and resulting in even greater shock to the fingers. According to one embodiment of the present invention, the attachment 22 covering the entire keyboard prevents particulates from passing between the keys into the keyboard. Among other advantages, such a system ensures that the attachment surface can be easily cleaned, the keys do not stick, and reduces the shock to the fingers otherwise occurring upon actuation of a stuck key.

The upper surfaces of key pillows 26 are preferably textured to reduce the likelihood of a finger slipping on a key, and to reduce the force necessary to depress a key. As would be appreciated by those skilled in the art, the key pillows may be textured in various configurations, including, for example, nubs, ridges, fine bristles, or the character (s) appearing on the key being raised relative to the key surface. In a preferred embodiment, a representative outline of the alphanumeric character or function associated with a particular key may be indicated on the upper surface of the key pillow located thereon. The upper surface of the key pads may additionally or alternatively be covered with or made of a slip-resistant material. That is, the coefficient of friction of the keyboard or attachment according to the present invention is greater than on a standard computer keyboard.

As previously indicated, the height and angle of inclination of key pillows 26 on top of keyboard 20 may vary with respect to each other. In one embodiment, the key pillows in the first and second rows (i.e., the rows starting with "A" and "q", respectively) of a conventional QWERTY keyboard served by the pinky and ring finger (e.g., "q", "w", "tab", "caps lock", "shift", "'", "enter", ",", ".", and "/") may be extend higher and more so than other keys on the keyboard as shown, e.g. in FIG. 8, so as to be in a comfort zone of a user (e.g. so as to not require undue effort or strain to actuate the key). The key pillows in the first and second rows served by the pinky and ring fingers may additionally or alternatively have upper surfaces that are angled inward toward the center of the row or angled outward away from the center of the rows. The keys in the row above the home row may additionally or alternatively have surfaces angled downward toward the home row (i.e. the row beginning with "a" in a QWERTY format) so as to physically position the keys closer to the shorter pinky and ring fingers. In a preferred embodiment of the invention the key pillows in the home row and the row thereabove served by, and farthest from, the pinky and ring finger may include the greatest angle of inclination toward the center or downward toward the home row or even away from the home row. Providing these key pillows with a greater extension into the comfort zone relative to other surrounding key pillows makes it easier to strike these keys by minimizing the repetitive stretching, twisting, and reaching of the shorter pinky and ring fingers. This in turn, reduces the strain experienced by muscles and tendons in the lower arm, neck, and shoulder while typing.

Figure 8:
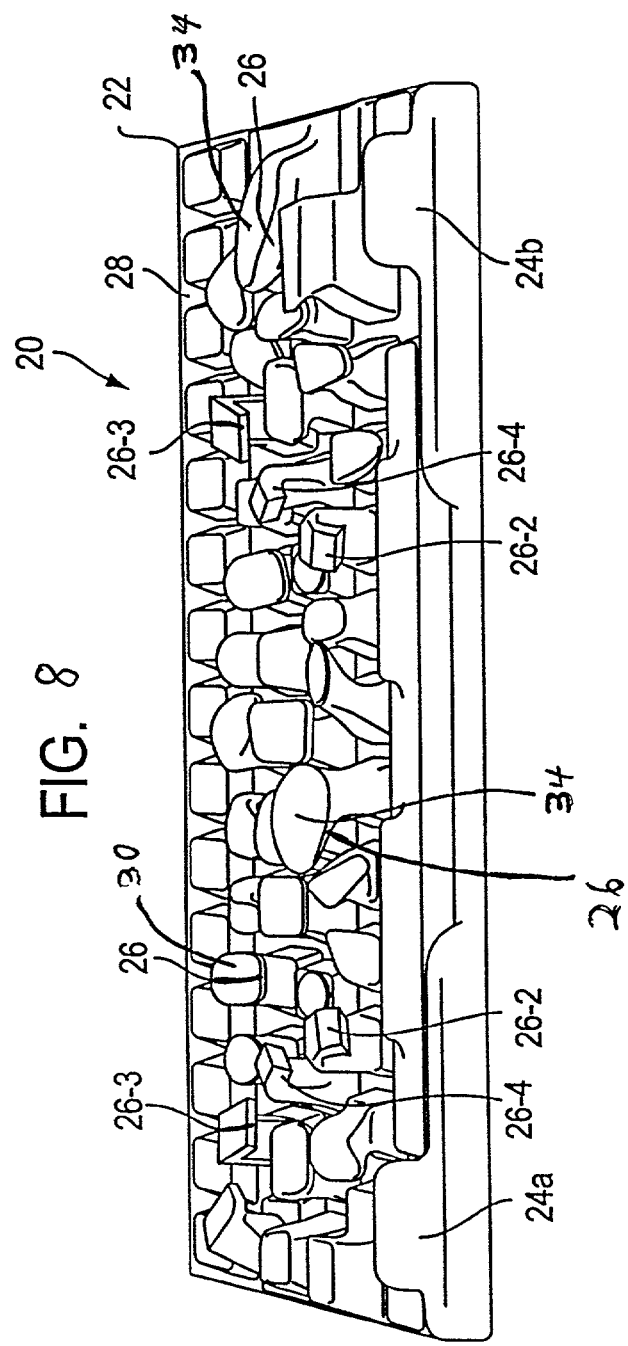
FIG. 8 shows an illustration of another embodiment of a keyboard of this invention.

In a preferred embodiment, the upper surfaces of the remaining key pillows in the home row and row thereabove, also be angled downward toward the home row e.g., as shown in FIG. 8. Moreover, the key pillow covering the space bar may include one or more elevated sections, against which the thumb may strike. By providing one or more raised surfaces over the space bar, the amount by which the hand must rotate and/or the amount by which the thumb must extend to depress the space bar is reduced. Again, inclining and/or elevating the upper surfaces of the above described key pillows makes it easier to depress these keys by minimizing the repetitive stretching, twisting, and reaching of the fingers. This, in turn, reduces the strain experienced by muscles and tendons in the lower arm, neck, and shoulder while typing.

Although a preferred embodiment includes key pillows with elevated and inclined upper surfaces, it is contemplated that the key pillows have even and substantially parallel upper surfaces, used in conjunction with other inventive features of the present invention, in alternative embodiments. Additionally, it is contemplated that each key have the same shape, contour and inclination in an alternative embodiment of the invention. By surfaces of the key pillows as used above to define the shape of the key pillows, this language is intended to describe the three-dimensional surface of the key pillows, and not simply the upper surfaces of the key pillows. Thus, it could be said that the key pillows have a sculpted form that extends into the comfort zone of a user.

Figure 17:
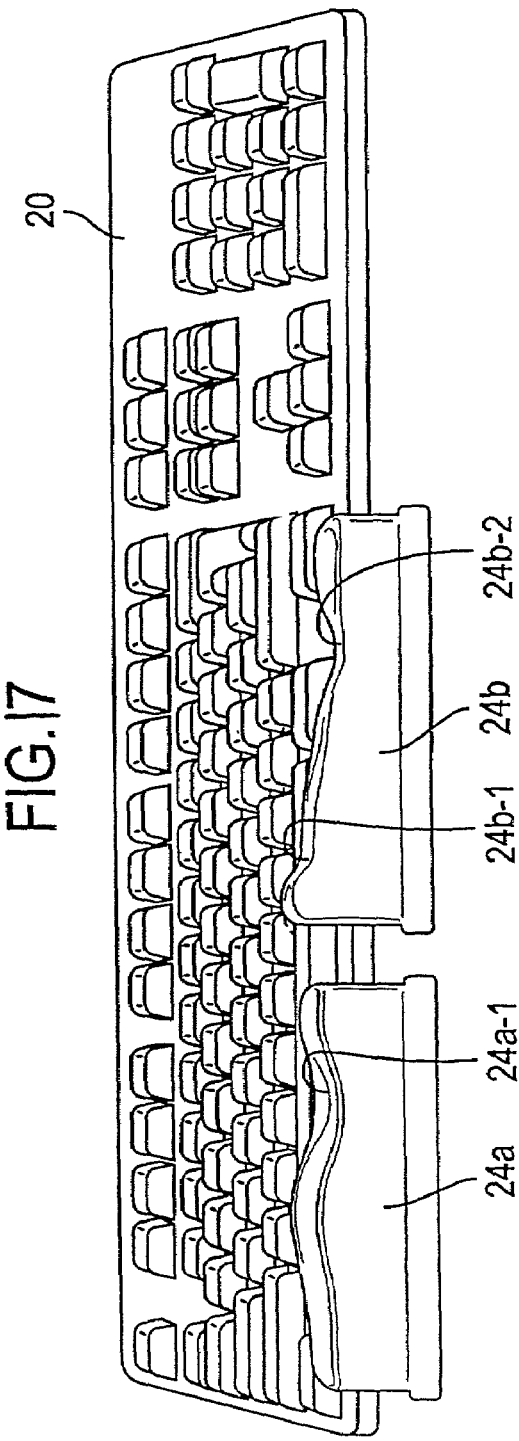
FIG. 17 is a view illustrating palm rests according to the present invention attached to a keyboard.

The present invention, optionally, further includes raised pads 24a and 24b shown in detail in FIG. 17. The pads are preferably formed integrally on attachment 22, but may alternatively be affixed to attachment 22 after formation thereof. it is also possible that the pads 24a and 24b are simply manufactured separately from the attachment 22 and later connected thereto or placed proximate to the keyboard in a position comfortable to the user.

The pads 24a and 24b are preferably slightly deformable so that the thenar eminence and hypothenar eminence of the hands may rest comfortably thereon, and may be formed of the same or different material as attachment 22 or key pillows 26. In a preferred embodiment, the pads may have a height of approximately 0.5 inches to approximately 3 inches, and optimally about 1 inch to about 2 inches. That is, in a preferred embodiment, the pads have a varying height across their width. The heights listed above may vary in alternative embodiments of the invention so as to accommodate hands of different users which vary in size. Alternatively, the pads may be uniform in height. The pads may be shaped so as to accommodate the contour of the hand or have a dip to avoid pressure on the carpal tunnel.

Although a preferred embodiment of the invention includes two pads, it is understood that there may be one long pad along the front of keyboard 20, or a pad comprised of several segments. The pads function to elevate a typist's palms relative to the keyboard during typing or resting. That is, the pads 24a and 24b maintain the user's palms at a height above the lip of the keyboard. The lip of the keyboard is that portion of the keyboard between the front of the spacebar and the front of the keyboard, with the front being the edge closest to the typist while maintaining a typing position. The pads additionally support the weight of a typist's hands, arms, and shoulders, thereby reducing strain at the neck and shoulders.

As indicated above, extended typing with the wrists bent at an awkward angle is a significant contributor to CTS and other repetitive strain injuries. The height of the palm rests allows the user to comfortably manipulate the key pillows 26 or conventional keys and easily rest his/her hands while reducing awkward bending of the wrist. Although a preferred embodiment includes pads 24a and 24b, it is contemplated that the pads may be omitted from the invention in alternative embodiments. The pads 24a and 24b preferably have a groove 24a-1, 24b-1 formed therein to accommodate the thumb or thenar eminence of the user to allow the user to more easily access the space bar and keys or key pillows of the keyboard. Also, each palm rest may have a central dip 24b-2 located therein for support of the carpal tunnel.

In one embodiment the invention provides an attachment to a keyboard including a plurality of key pillows 26 and pads 24a and 24b provided on the attachment 22 to form a continuous sheet over the keyboard. In other embodiments, of the present invention, instead of forming a continuous attachment, each of the key pillows may be independent pieces, which may be added to select keys on keyboard 20 as desired. In this embodiment, each individual key pillow may include a lower surface having a negative impression fitting partially or completely over select keys, and maintained thereon by a pressure contact between the key pillow and key or by an adhesive Velcro, or other attachment material. Alternatively, the individual key pillows may have a flat lower surface, and may be affixed to select keys by an adhesive or Velcro, etc. As a further alternative, selected keyboard keys may be omitted or removed, and the individual keys comprising key pillows as described herein mounted over the key posts protruding from the keyboard or into key slots/holes provided in the keyboard. The individual key pillows according to this embodiment may be formed with the same materials, textures, elevations, and inclinations as the key pillows described above as part of attachment 22.

In the embodiment described in the preceding paragraph, the pads 24a and 24b may be affixed to the front edge of the keyboard by a pressure fit, using Velcro (e.g. Velcro tape) an adhesive, or other method. It is equally possible that the pads 24a and 24b are not fixed to the keyboard, but rather are simply used proximate the keyboard. It is also possible that only a single palm rest is used, rather than two palm rests. Such may be the case where the user is operating a mouse, such as that shown in FIG. 18, with a single hand.

When the key pillows are attached to selected individual keys of the keyboards (or substituted for existing keys), the key pillows preferably extend into the comfort zone of the user as described herein. That is the key pillows are disposed so as to be easily reached by the fingers and hands of a user without undue stretching or twisting of the fingers, hands, and wrists, thereby decreasing the user's chances of incurring a RSI such as Carpal Tunnel Syndrome.

As an alternative embodiment, the keyboard may be formed as a attachment 22 shown in FIG. 9. The key pillows 26 are formed thereon and replace the keys of the keyboard 20. As shown in this drawing, the palm rests 24a and 24b are integral with the attachment 22, which acts as the keyboard 20. Also, the palm rests according to this present invention, e.g., as shown in FIG. 17 may be used with a conventional keyboard as shown in FIG. 17.

Figure 11:
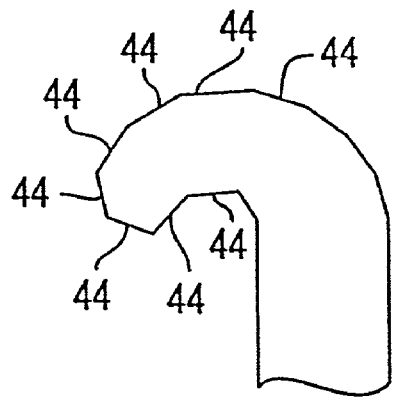
FIG. 11 is a sectional view of a key according to one embodiment of the present invention.
Figure 12:
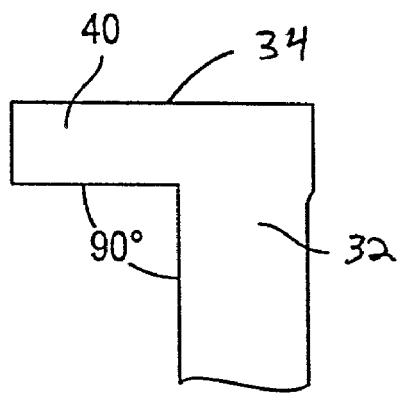
FIG. 12 is a sectional view of a key according to another embodiment of the present invention.
Figure 13:
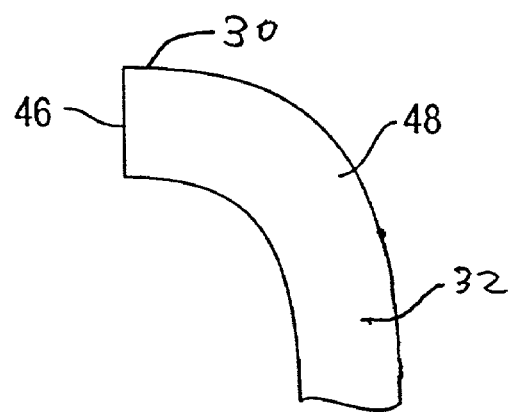
FIG. 13 is yet another sectional view of a key of the keyboard according to yet another embodiment of the present invention.
Figure 16:
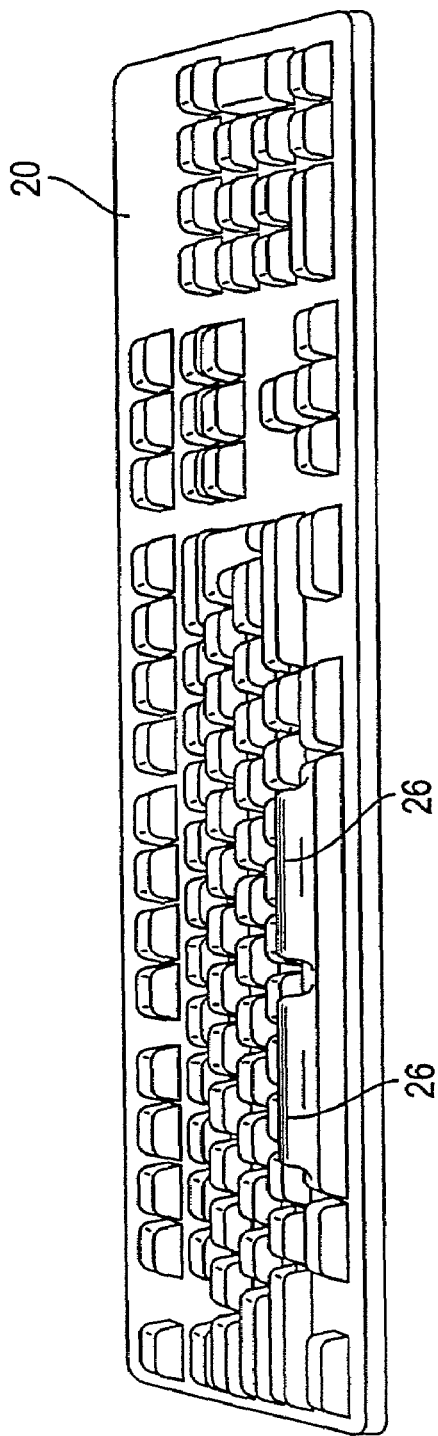
FIG. 16 is a perspective view of another embodiment of the present invention where only a single key, e.g., the spacebar, extends into a comfort zone of a user.

In an alternative embodiment, the keyboard is formed to have only a single key pillow formed thereon. One such device is shown in FIG. 16, where the key pillow 26 is formed only on the space bar. Although other keyboards might have the single key pillow 26 thereon, the key that includes the key pillow is preferably one that is used often, such as the space bar, the shift, or the enter button. The keys of the keyboard may be formed as shown in FIG. 1 through FIG. 8 or may be variants thereof. FIG. 11 illustrates key pillows that extend into a comfort zone of a user and whose shape is that of a plurality of line segments 44 joined together for form a continuous semi-curved surface any one of which may act as a striking face 34. Alternatively, as shown in FIG. 12 the key pillows could be formed as two blocks, 40 and 32, that intersect at an angle of up to 90 degrees. Alternatively, as shown in FIG. 13, the key pillows could be formed with a flat top surface 46 and an arcuate stem 48. Any and all of these key pillows e.g., as shown in FIG. 3A, FIG. 3B, FIG. 11, FIG. 12, could be incorporated into a single keyboard. As shown in FIG. 8, key pillows corresponding to those shown in FIG. 11 are labeled 26-2, those corresponding to FIG. 12 are labeled 26-3, and those corresponding to FIG. 13 are labeled 26-4.

Figure 14:
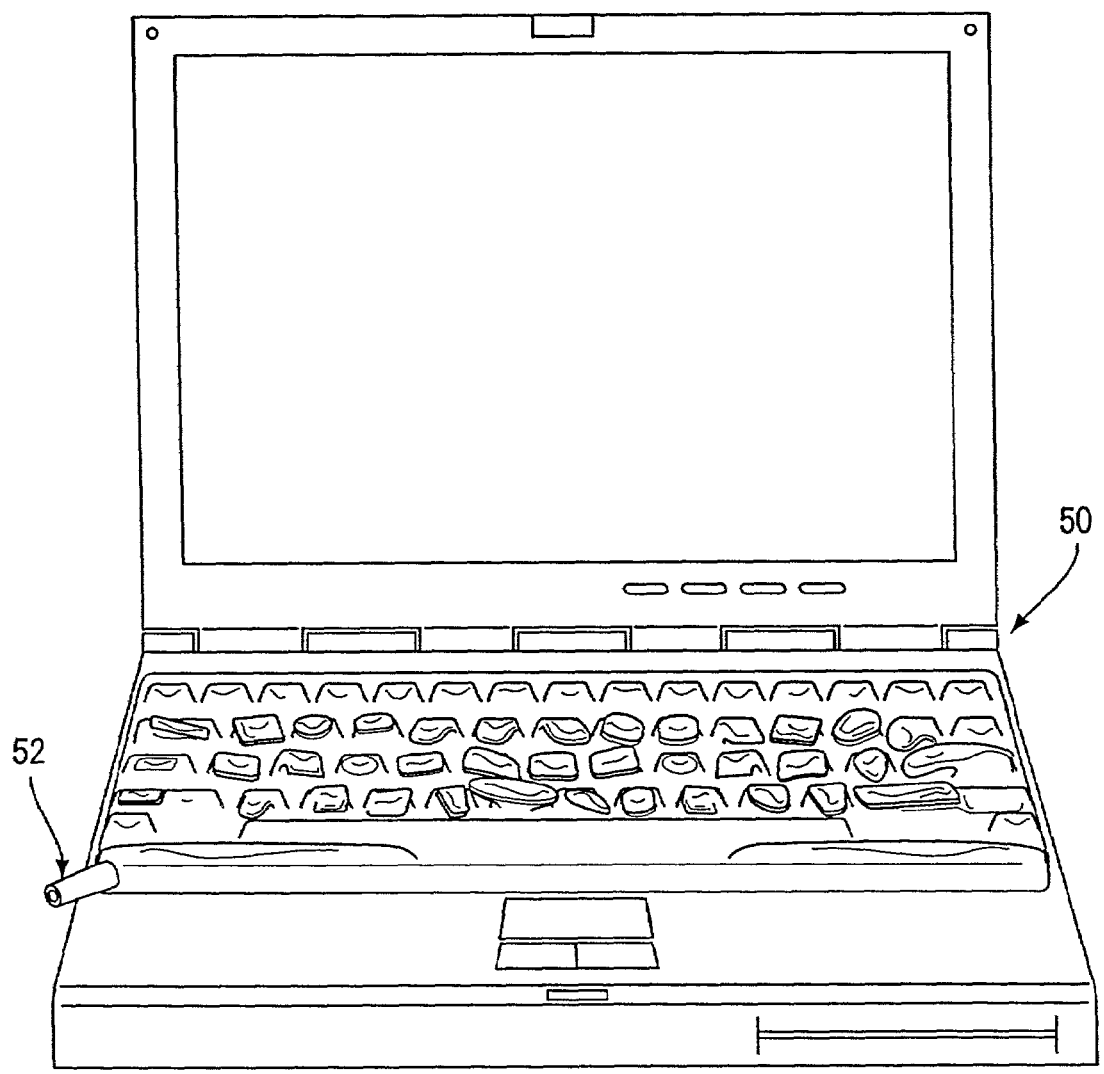
FIG. 14 is a perspective view of a keyboard which has a key pillow assembly according to the present invention and is deflatable/compressible for use with portable computers and other devices and is shown in a deflated/compressed state.
Figure 15:
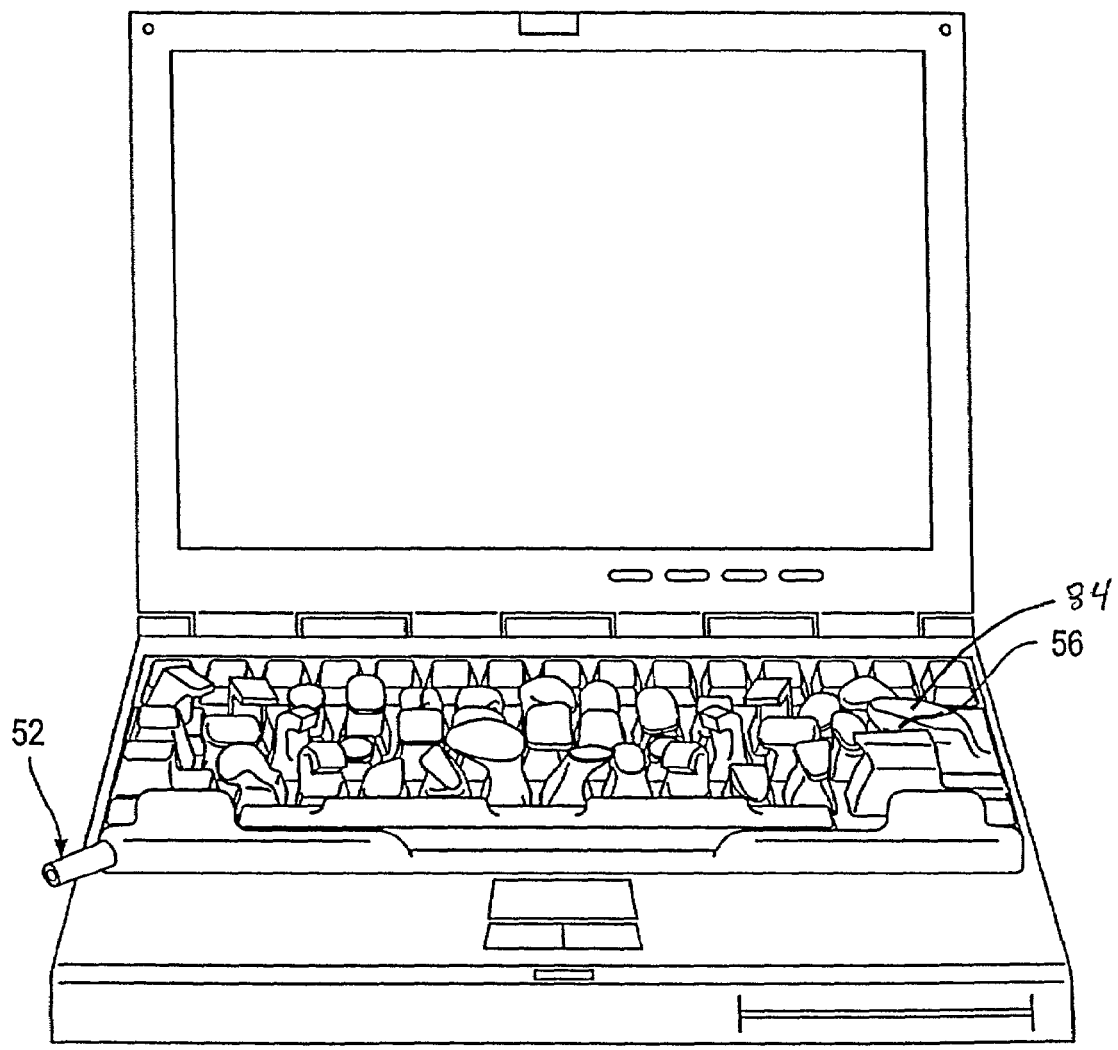
FIG. 15 is a perspective view of keyboard which has a key pillow assembly according to the present invention and is compressible or deflatable for use with portable computers or other devices and is shown in the inflated/expanded state.

FIG. 14 and FIG. 15 illustrate another embodiment of the present invention, which is particularly useful for portable computers 50 and other portable devices e.g. devices which incorporate processing units (CPUs) and which require some input through a keyboard. A laptop computer is depicted in FIG. 14. The keyboard with key pillows formed thereon is inflatable through in inlet 52. It is also possible to have the keyboard automatically inflate. Alternatively the key pillows are a viscoelastic material that simply deforms when the computer is closed and regains its form when the computer is open. Thus, the key pillows may be deflated/compressed, e.g. as shown in FIG. 14, for a compact profile facilitating storage and carrying. When the computer is opened, the key pillows 56 may be inflated or naturally expand (e.g. through an elastic process) and regain their desired shape (e.g. as shown in FIG. 15).

Figure 18:
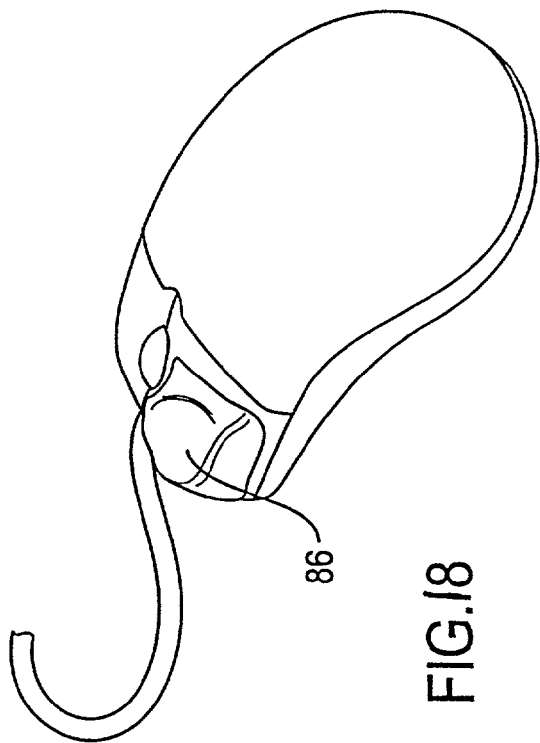
FIG. 18 is a view of a computer mouse having keys thereon that extend into a comfort zone of a user.

As noted above, the present invention may be utilized on devices other than keyboards. Computer mice are just such an example. Use of computer mice can be a significant source of RSI. FIG. 18 illustrates the present invention as applied to a computer mouse. The mouse is shown with a key pillow 86 formed thereon, with the key pillow extending into the comfort zone of a user.

The keys, key pillows, keyboards, keyboard attachments, and the like of this invention are fabricated using standard methods well known to those of skill in the art. Keyboard manufacture methods, plastic extrusion methods, and the like are fully described in a number of references (see, e.g., U.S. Pat. RE32,419) and are well known to the manufacturers of such equipment.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims. All publications, patents, and patent applications cited herein are hereby incorporated by reference in their entirety for all purposes.

What is claimed is:

1. A keyboard comprising a plurality of keys including alphanumeric keys disposed such that the alphanumeric keys form a continuous key array defining a key array surface having at least two concave regions, wherein a plurality of keys comprising one of said at least two concave regions are non-rectilinear keys, at least two keys in a row are shaped differently from each other, wherein the orientation of the major principal axis of the striking faces of the keys in a row varies with the position of the keys in said row.

2. The keyboard of claim 1, wherein the plurality of keys comprising at least one of said at least two concave regions in said key array are not stepped.

3. The keyboard of claim 1, wherein:
striking faces of the keys comprising said concave regions are disposed at varying heights such that the faces in a home row typically struck with a pinky finger of a user are higher than keys in a home row typically struck by the middle finger of a user;
the angle of the striking faces of the keys varies with the location of the keys in the keyboard; and
the planar projections of the striking faces of a plurality of keys comprising said concave regions are not rectilinear.

4. The keyboard of claim 1, wherein the planar projection of the striking faces of a plurality of keys comprising at least one of said at least two concave regions are not rectangular, not circular, not square, and not L-shaped.

5. The keyboard of claim 1, wherein the planar projection of the striking faces of the plurality of keys comprising at least one of said at least two concave regions are substantially ovoid.

6. The keyboard of claim 1, wherein a row of keys in the keyboard comprises three or more letter keys the striking faces of which have different lateral offsets.

7. The keyboard of claim 1, wherein a row of keys in the keyboard comprises three or more letter keys the striking faces of which have different forward offsets.

8. The keyboard of claim 1, wherein said keyboard comprises a row of keys wherein the orientation of the striking faces of the keys varies along the row.

9. The keyboard of claim 1, wherein said alphanumeric keys comprise "K" and "D" keys, and the striking faces of the "K" and "D" keys have the lowest striking faces of all of the letter keys.

10. The keyboard of claim 1, wherein one of said plurality of keys comprises two striking faces.

11. The keyboard of claim 1, wherein the planar projection of the striking faces of a plurality of keys comprising one of said at least two concave regions are not square, not circular, not L-shaped, and not rectangular, and wherein the orientation of the striking faces of said keys varies along a row.

12. The keyboard of claim 1, wherein keys comprising a row above a home row have surfaces angled downward toward the home row so as to physically position the keys closer to a pinky and ring finger of a user.

13. The keyboard of claim 1, wherein the keys comprising a row below a home row have surfaces angled upward toward the home row so as to physically position the keys closer to the pinky and ring fingers of a user.

14. The keyboard of claim 1, wherein the vertical distance between the lower-most striking face of one of said plurality of keys comprising one of said concave regions and the uppermost striking face of a key on said keyboard is at least about 5 mm.

15. The keyboard of claim 1, wherein the vertical distance between the lower-most striking face of one of said plurality of keys comprising one of said concave regions and the uppermost striking face of a key on said keyboard is at most about 10 mm.

16. The keyboard of claim 1, wherein a "D" key forms the lowest point of one of said concave regions.

17. The keyboard of claim 1, wherein a "K" key forms the lowest point of one of said concave regions.

18. The keyboard of claim 1, wherein the keys comprising at least one of said concave regions in said key array have striking faces oriented such that lines normal to the striking faces at least four keys all point in different directions.

19. The keyboard of claim 1, wherein one of said plurality of keys comprising one of said concave regions has a key face rotated to substantially align with said key array surface within one of said concave regions.

20. The keyboard of claim 1, wherein said key array comprises at least two keys having different angles and slopes from each other.

21. The keyboard of claim 1, wherein said key array comprises at least four keys having different angles and slopes from each other.

22. The keyboard of claim 1, wherein said key array comprises a key having a striking face the planar projection of which describes an ellipse.

23. The keyboard of claim 1, wherein said key array comprises a plurality of keys each having a striking face the planar projection of which describes an ellipse.

24. The keyboard of claim 23 wherein the major axis of the ellipses of a plurality of keys are directed diagonally generally toward the center of said keyboard.

25. The keyboard of claim 1, wherein said key array comprises a key comprising a striking surface having an angle and a slope such that the surface of the striking face is not generally parallel to the keyboard surface, but is oriented generally perpendicular to the line of action of a finger striking said face when a users hands are positioned in home position and the finger used to strike said key is the finger used in a standard touch typing system.

26. The keyboard of claim 1, wherein the keys comprising the key array have a center to center spacing less than 0.750 inches.

27. The keyboard of claim 1, wherein the keys comprising the key array have a center to center spacing ranging from about 0.5 to about 1.0 inches.

28. The keyboard of claim 1, wherein letter or punctuation typically keys struck by the fifth finger of a user have a larger striking face than the striking face of keys typically struck by the first (index) finger of a user in a standard touch typing system.

29. The keyboard of claim 1, wherein the distance between the edges of the striking faces of two adjacent keys varies along said edges.

30. The keyboard of claim 1, wherein said key array comprises a row of keys in which each key in said row has a single topmost point.

31. The keyboard of claim 30, wherein the spacing between the topmost point of the keys in said row is not constant.

32. The keyboard of claim 1, wherein said key array comprises a row of keys in which each key in said row has a single bottom-most point.

33. The keyboard of claim 32 wherein the spacing between the bottom-most point of the keys in said row is not constant.

34. The keyboard of claim 1, wherein said key array comprises a row of keys in which different keys in said row have a different forward extent.

35. The keyboard of claim 1, wherein said key array comprises a row of keys in which different keys in said row have a different side extent.

36. The keyboard of claim 1, wherein a plurality of keys comprising at least one of said at least two concave regions have an off-center axis.

37. The keyboard of claim 1, wherein said key array comprises keys having a round softer than 0.02 inch.

38. The keyboard of claim 37, wherein said key array comprises keys having a round ranging from 0.005 inch to 0.05 inch.

39. The keyboard of claim 1, wherein a plurality of keys comprising at least one of said at least two concave regions comprise key skirts that are not uniform.

40. A keyboard comprising a plurality of keys including alphanumeric keys disposed such that the alphanumeric keys form a continuous key array defining a key array surface having at least two concave regions, wherein a plurality of keys comprising one of said concave regions have a striking face that is substantially elliptical in shape, wherein the major axis of the ellipses of said keys are directed diagonally generally toward the center of each concave region of said keyboard.

41. The keyboard of claim 40, wherein said key array comprises keys having a round softer than 0.02 inch.

42. The keyboard of claim 41, wherein said key array comprises keys having a round ranging from about 0.005 inch to about 0.5 inch.

43. A keyboard comprising a plurality of keys including alphanumeric keys disposed such that the alphanumeric keys form a continuous key array defining a key array surface having at least two concave regions, wherein a plurality of keys comprising one of said at least two concave regions are non-rectilinear keys, at least two keys in a row are shaped differently from each other, wherein letter or punctuation typically keys struck by the fifth finger of a user have a larger striking face than the striking face of keys typically struck by the first (index) finger of a user in a standard touch typing system.

44. A keyboard comprising a plurality of keys including alphanumeric keys disposed such that the alphanumeric keys form a continuous key array defining a key array surface having at least two concave regions, wherein a plurality of keys comprising one of said at least two concave regions are non-rectilinear keys, at least two keys in a row are shaped differently from each other, wherein said key array comprises a row of keys in which each key in said row has a single topmost point.

45. The keyboard of claim 44, wherein the spacing between the topmost point of the keys in said row is not constant.

46. A keyboard comprising a plurality of keys including alphanumeric keys disposed such that the alphanumeric keys form a continuous key array defining a key array surface having at least two concave regions, wherein a plurality of keys comprising one of said at least two concave regions are non-rectilinear keys, at least two keys in a row are shaped differently from each other, wherein said key array comprises a row of keys in which each key in said row has a single bottom-most point.

47. The keyboard of claim 46, wherein the spacing between the bottom-most point of the keys in said row is not constant.

* * * * *